April 12, 1966 I. E. RUBIN 3,246,130

EXTRAPOLATION COMPUTER USING REVERSIBLE COUNTER FOR TRAJECTORY MEASUREMENT

Filed Feb. 25, 1965 3 Sheets-Sheet 1

INVENTOR.
ISIDORE E. RUBIN,

BY Michael Masnik

HIS ATTORNEY.

INVENTOR:
ISIDORE E. RUBIN,
BY Michael Masnik
HIS ATTORNEY.

INVENTOR:
ISIDORE E. RUBIN,
BY Michael Masnik
HIS ATTORNEY.

United States Patent Office 3,246,130

Patented Apr. 12, 1966

3,246,130

EXTRAPOLATION COMPUTER USING REVERSIBLE COUNTER FOR TRAJECTORY MEASUREMENT

Isidore E. Rubin, Syracuse, N.Y., assignor to General Electric Company, a corporation of New York Filed Feb. 25, 1965, Ser. No. 440,345
2 Claims. (Cl. 235—152)

This invention relates to apparatus for performing certain measurements and computations and particularly to an arrangement for determining the value of a function by extrapolation when two points of the function are known. The application is a continuation-in-part of application S.N. 23,333 filed April 19, 1960 in the name of the present inventor and now abandoned.

Oftentimes there is a need in the electrical and electronic arts to measure or determine the value of a function, such as velocity, at a given value of independent variable, such as time. Oftentimes it is not possible to make measurements at the desired time, but it is possible to make measurements at other time periods. A need therefore arises for providing an automatic method and arrangement for extrapolating the measured information in order to determine the values of velocity at other time intervals. Systems are in existence which permit measurement of velocity at any time interval. However, under certain circumstances this may not be possible. Prior arrangements for extrapolating for the desired information have been found to be cumbersome, complicated, erratic, and time consuming.

Accordingly, it is an object of this invention to provide an improved extrapolation arrangement.

A further object of this invention is to provide an arrangement for determining the value $V_0$ of a dependent function which varies in a linear or curvilinear manner with an independent variable $t$ when the value of the dependent function is known in at least two points.

A further object of this invention is to provide an improved signal processing arrangement.

A further object of this invention is to provide an improved arrangement for extrapolating from known points on a curve to other unknown points on the curve.

Briefly, in accordance with one embodiment of this invention, an arrangement is provided for determining the value $V_0$ of a dependent function which varies in a linear or curvilinear manner with an independent function $t$ when the value of the dependent function is known in at least two points (at $V_1$ and $T_1$ and at $V_2$ and $T_2$), which comprises obtaining the algebraic difference $2V_1-V_2$ in a single reversible counter to obtain $V_0$. The point $T_1$ is selected to be a desired operating point and $T_2$ is selected to be $2T_1$ with $T_1$ being $T_{1'}+\Delta T$ and $\Delta T$ having a departure from zero depending upon the degree of departure of the curve from a straight line. The value of V at $T_{1'}$ is selected to be the value of V at $T_1$ in performing the extrapolation such that the correct value of $V_0$ is derived even though the function is curvilinear.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings in which:

FIGS. 1*a*, 1*b* and 1*c* illustrate graphically certain principles underlying the present invention.

Figure 1A:
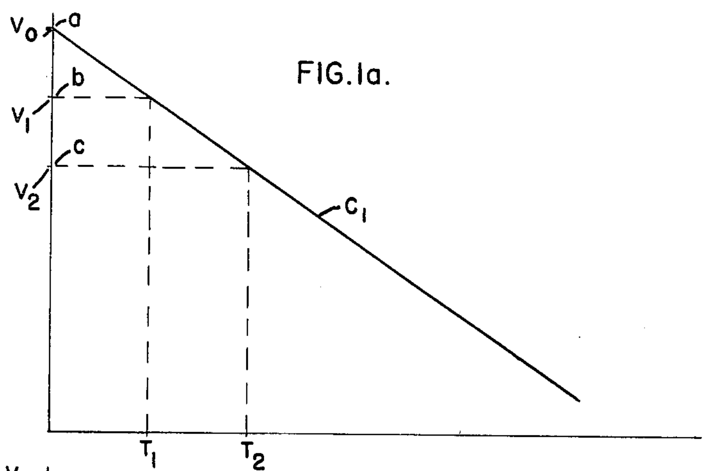
Figure 1B:
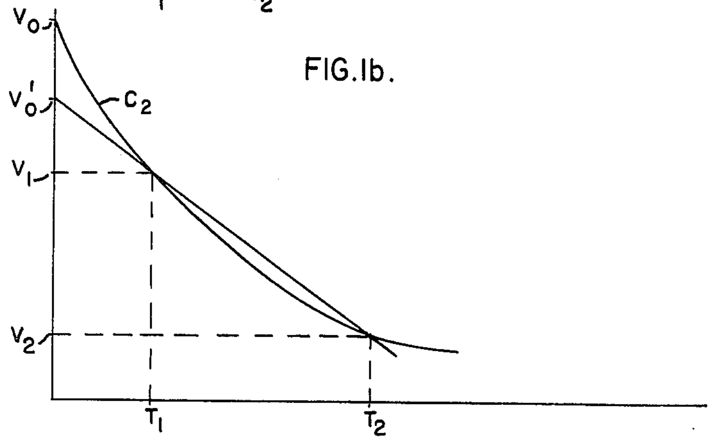
Figure 1C:
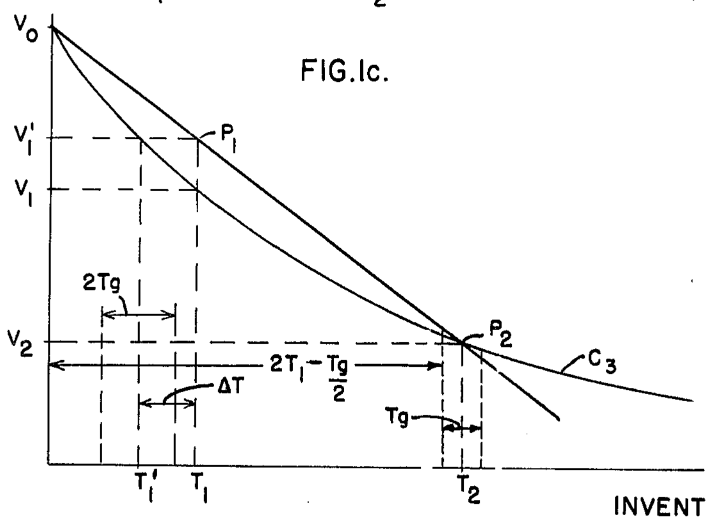

Referring now to the drawings and in particular FIGS. 1*a*, 1*b*, and 1*c* thereof, FIG. 1*a* illustrates graphically a linear function and FIG. 1*b* a curvilinear function. In FIG. 1*a* a function V is plotted as ordinate and an independent variable or a parameter $t$ is plotted as abscissa. If the values $V_1$ and $V_2$ are known at the points $T_1$ and $T_2$, it is possible to extrapolate along the curve $C_1$ and determine the initial condition $V_0$. In accordance with one embodiment of this invention, if the point $T_2$ is selected to be $2T_1$ by well-known trigonometric principles the distance *ab* equals the distance *bc*. Thus by performing the subtraction operation $2V_1-V_2$, the initial condition $V_0$ is obtained.

Difficulties are encountered when this procedure is applied in the case of a curvilinear function as shown in 1*b*. An inspection of this curve, $C_2$, wherein a function V is plotted as ordinate and a parameter T plotted as abscissa, illustrates that the procedure utilized in connection with explaining 1*a* would result in an erroneous calculation of the initial value $V_0$, which is different from the actual value $V_0$ depending upon the shape of the curve.

To compensate for such nonlinearity in accordance with the principles of the invention, a value $(V_{1'})$ of V is measured as shown in FIG. 1*c* at a time $(T_{1'})$ so displaced from $T_1$ that a straight line between the points $V_{1'}T_1$ (the point $P_1$ in FIG. 1*c*) and $V_2T_2$ ($P_2$ in 1*c*) extends through $V_0$ as shown. If $T_{1'}$ is properly chosen the correct value $V_0$ may then be obtained by the computation $V_0=2V_{1'}-V_2$ in the same manner previously explained in connection with FIGURE 1*a*.

The question arises as to how much difference there should be between $T_{1'}$ and $T_1$, or that is, what should be the magnitude of the interval $\Delta T$ between $T_{1'}$ and $T_1$. Assuming that the shape of the curvilinear function is known, FIGURE 1*c* illustrates the manner in which the desired $\Delta T$ is selected. In this case, any desired value of $T_2$ may be arbitrarily selected, thus fixing the point $P_2$. A straight line may then be drawn between the point $P_2$ and the point $V_0$ at which the curve $C_3$ intersects the V axis. Next, a value $T_1$ equal to one-half $T_2$ is found, thus fixing the point $P_1$ in FIG. 1*c*, and a line then is projected from this point $P_1$ to the V axis. The point of intersection between this line and the curve $C_3$ is the point at which the first sampling of the V function must be taken, and a line projected downwardly from this point to the T axis yields the time $T_{1'}$ at which this first sampling is to be made. The time differential between times $T_1$ and $T_{1'}$ is equal to $\Delta T$, and may be measured directly along the abscissa in FIGURE 1*c* in whatever time units are used for measure of $T_1$ and $T_2$.

Selection of $\Delta T$ in the manner just described requires knowledge of the value of V at time $T_0$ or at other desired T, for the particular curve of V against T in question: The $\Delta T$ value thus derived is valid for subsequent measurements and extrapolation along the same curve, and holds also for all members of a family of similarly shaped curves. Accurate extrapolation in accordance with the invention thus is possible for any member of a family of substantially parallel curves without necessity for additional known values of V at $T_0$ or plotting of curves since a common value of $\Delta T$ will serve for all.

This ability to extrapolate any of a family of curves when characteristics of one member of the family is known has particular value in ballistics studies such as measurement of muzzle velocity of guns. While it is difficult to obtain a measure of projectile velocity $(V_0)$ directly at the gun muzzle, it is relatively easy to obtain radar measures of projectile velocity at points some distance away from the gun. Assuming similar aerodynamic characteristics of projectiles, then a plot of projectile velocity against either time or distance travelled will produce, for different values of muzzle velocity, a family of curves which are all substantially parallel. Assuming that muzzle velocity ($V_0$) is known or can be determined through other means for any one of these curves, so that a plot such as FIGURE 1*c* can be set up and measurements of $\Delta T$, $T_1$ and $T_2$ taken from it, then velocity measurements taken at times $T_2$ and $T_{1'}$ will yield accurate measures of the value $V_0$ through extrapolation in accordance with the invention.

Figure 2:
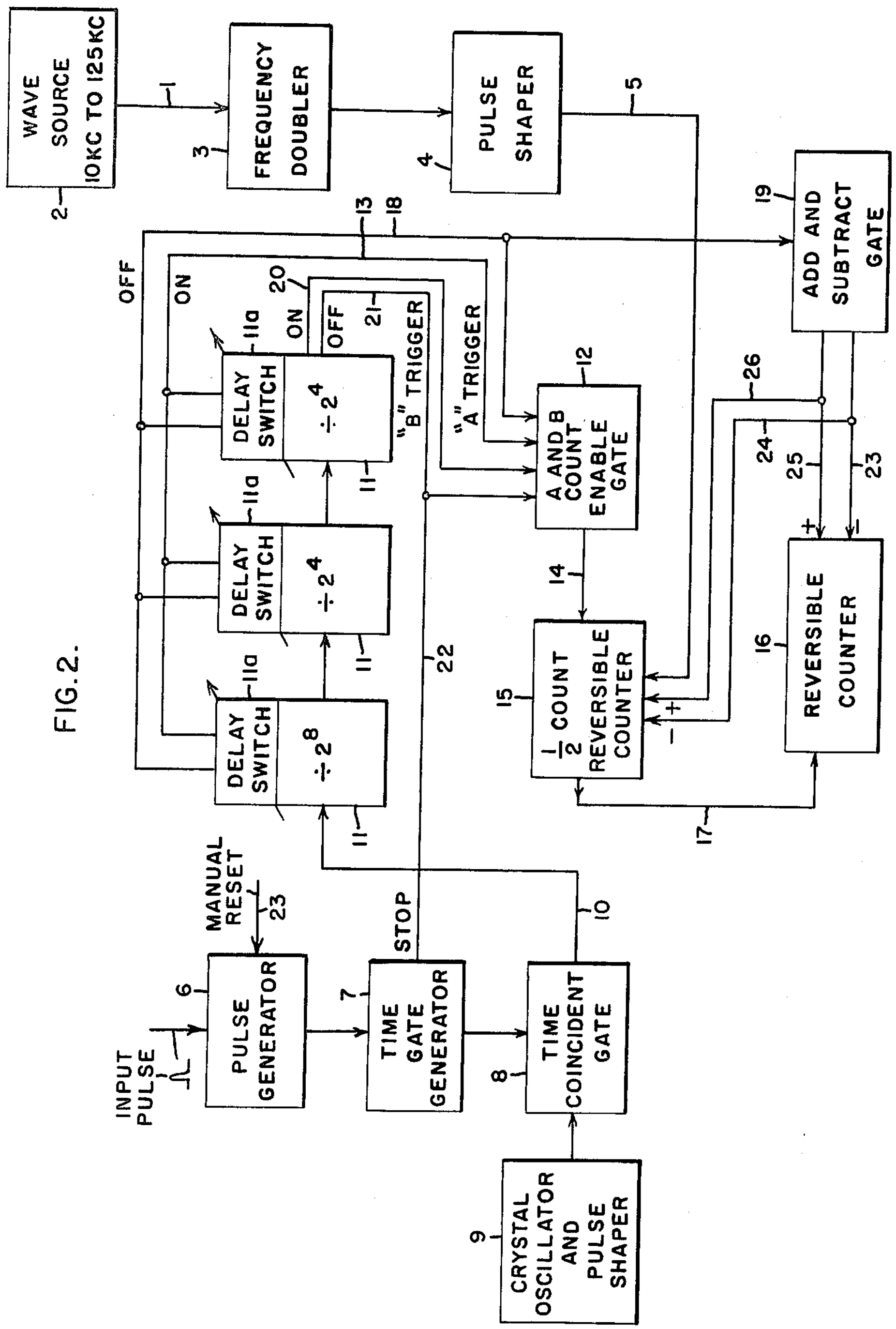
FIG. 2 illustrates in block diagram one application of the present invention to measuring muzzle velocity.

Referring to FIG. 2 of the drawings, there is shown an embodiment for computing the velocity at time $T=0$ for the characteristic, say $C_3$, of FIG. 1*c*. It is necessary to obtain velocity readings at two points on the curve. Referring to FIG. 1*a*, if $T_2=2T_1$, then $V_0=2V_1-V_2$. The velocities $V_1$ and $V_2$ are selected to be the average of the velocity measurements taken during a given measuring period $2T_g$ for $2V_1$ and $T_g$ for $V_2$. Referring to FIG. 1*c*, it is seen that the delay time for commencing the measuring period for $V_2$ must be $2T_1-T_{g/2}$ in order to make $T_2=2T_1$. In accordance with an embodiment to be explained in detail, the delay time for starting the two velocity measuring periods is determined by the position of manual selector switches. The computing action is as follows: The velocity $2V_1-V_2$ is displayed or registered on a decade reversible counter. The algebraic difference between $2V_1$ and $V_2$ is stored, giving $V_0$, and this resultant count is indicated on the decade indicator. As previously explained, due to the change of slope of the curve, it is necessary to measure the velocity $V_{1'}$ rather than $V_1$, which means that the measure is to be taken at time $T_{1'}$ rather than $T_1$. To accomplish such measurement over a time interval $2T_g$, it is necessary to start measuring the velocity at a time $T_{1'}-T_g$. In knowing the approximate curvature of $C_3$, the value of $T_{1'}-T_g$ is selected by the manual selector switches so that $V_{1'}$ is obtained rather than $V_1$.

In explaining FIG. 2, it should be noted that signals appear on lead 1 from a source 2 having a frequency corresponding to the velocity of an event which varies with time as shown by curve $C_3$ of FIG. 1*b*. In order to decrease the possible error due to operation of certain signal gates to be described, the frequency has been doubled in 3 for processing in these gating circuits. Then in order to read the velocity directly in feet per second, the data from the gating circuits to be described is sent to decade counters via a divide-by-two stage which also contains a half-count reversible counter. This method reduces the possible gate ambiguity error from $\pm 1$ count to $\pm \frac{1}{2}$ count per gate. Also reducing maximum error is the wider gate used for $2V_1$ which is $2T_g$ as previously described ($V_2$ uses $T_g$).

The doppler or frequency signal is a sine wave and becomes a square wave after being applied to a frequency doubler 3; for example, a Schmidt trigger flip-flop feeding a dual triode circuit. The square wave doppler output signals from the two plates of the Schmidt trigger are 180° out of phase. The frequency doubler 3 feeds pulse shaper 4. Both sections of the dual triode are operated at cut-off bias and each grid receives one of the two differentiated outputs from each plate of the Schmidt trigger. (If operated at zero bias, positive pulses can be obtained.) Because the two triode sections are operating at cut-off, only positive pulses on the grid are amplified by the tube and appear as negative trigger pulses at the common plate resistor. This results in negative pulses at twice the doppler frequency at lead 5.

A trigger pulse is generated by 6 near the start of the event defined by curve $C_3$ of FIG. 1*c*. This, in turn, triggers the time gate generator 7 which opens the gate 8. The opened time gate passes shaped pulses from crystal oscillator and pulse shaper 9 over lead 10 to the count-down chain of flip-flops 11.

An "A" count enable gate 12 opens only for a period $2T_g$ in response to a signal available on lead 13 after a delay of $T_1-\Delta T-T_g$ according to the position of one of the manually operated time delay switches 11*a* associated with chain 11. The beginning of this A gate signal available on lead 14 passes the output of the pulse shaper 4, which constitutes pulses at twice the doppler frequency rate, to any well-known ½ count reversible counter-divide-by-two stage 15 and then to the chain of reversible decade flip-flops 16 over lead 17. The ½ count reversible counter 15 divides its input by two and drives the decades at the doppler frequency to register a count corresponding to a velocity, say $2V_{1'}$. The trigger signalling the end of the A gate signal is available on 18 and flips the add-subtract gate 19 to subtract from its previous add position. This is accomplished by having gate 19 applied over leads 23 and 24 to reversible counters 15 and 16.

At a time delay of $2T_1-T_{g/2}$, a start trigger pulse becomes available on lead 20 from the divider chain 11 for causing A and B count enable gate 12 to provide the start of a B gate on lead 14. B gate operates 15 permitting subtraction of the pulses on lead 5 corresponding to $V_2$ from the number of pulses already stored in 15 and 16 and corresponding to $2V_{1'}$. After a period $T_g$, determined by the count-down chain of flip-flops 11, the end of the B gate signal available on 21 shuts off the enable gate 12 and the further subtraction of pulses 15 and 16. The various times T are determined by the combined setting of the three delay selector switches 11*a*. In a particular embodiment, it was possible to vary T in steps of approximately 183 microseconds. By using such a coincident type of timing circuit, accurate timing can be obtained with no calibration problem, as opposed to an analog type timing circuit. The count enable gate 12 permits pulses to be counted only during the A or B gating periods by allowing pulses to trigger the counter only during this period.

The B "off" pulse appearing on lead 21 is also sent to the time gate generator 7 over 22. This closes the time coincidence gate 8 and thereby prevents the count-down chain 11 from re-cycling.

The ½ count reversible counter registers ½ counts which are combined with the whole number counts available in 16 to yield the total count which provides $V_0$.

This completes the sequence of operation. To perform a new computation for extrapolating for $V_0$, the decade indicators and flip-flops 11 are reset to their original condition by a suitable manual control.

Figure 3:
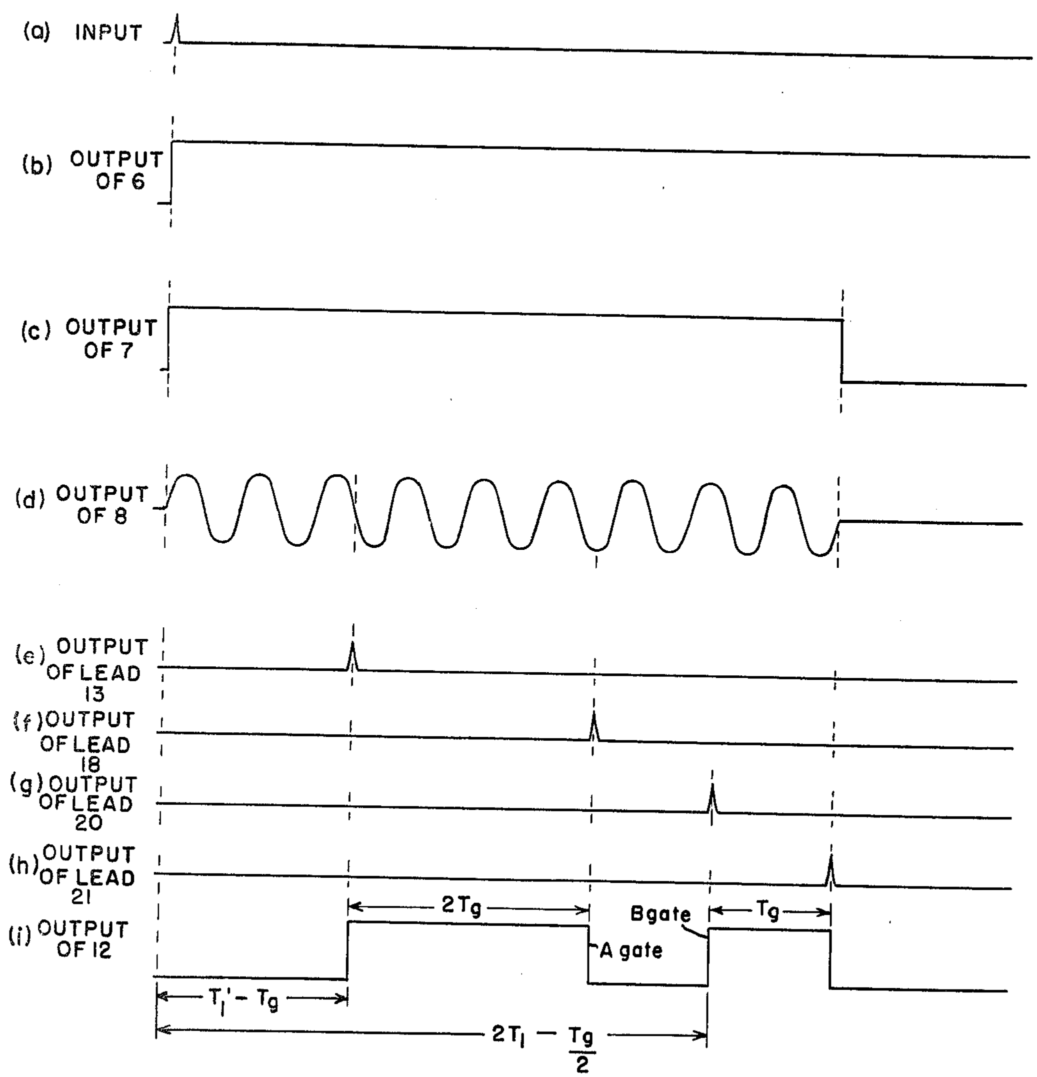
FIG. 3 illustrates certain waveforms useful in explaining the arrangement of FIG. 2.

Use is made of the drawings of FIG. 3 to recapitulate a sequence of operation of the arrangement of FIG. 2. An input pulse (FIG. 3*a*) signifying of the start of an event causes pulse generator 6 to provide a pulse of long duration determined by the manual reset 23 for application to generator 7. The leading edge of this pulse (FIG. 3*b*) causes 7 to start generating the pulse (FIG. 3*c*). Pulse 3*c* opens gate 8 to permit timing oscillations from 9 shown in FIG. 3*d* to be passed to the timing flip-flops 11 for producing the A and B gates. After a number of oscillations have been counted by flip-flops 11, a trigger pulse (FIG. 3*e*) is produced on lead 13 at time $T_1-\Delta T-T_g$ or $T_{1'}-T_g$ which causes enable gate to start generating an A gate for a period of time $2T_g$ whereupon flip-flops 11 produce a cut-off pulse (FIG. 3*f*) causing enable gate 12 to stop further generation of the A gate. During the period of the A gate, variable or doppler frequency pulses are passed over lead 5 for counting by 15 and 16. The number of such variable frequency pulses counted by 15 and 16 establishes the value of $2V_{1'}$. Pulse 3*f* also resets reversible counters 15 and 16 from add to subtract position by supplying control signals from 19 over leads 23 and 24 to reversible counters 16 and 15. For further details of the functioning of a reversible counter, reference can be made to Proc. IRE, November 1952, A Transistor Reversible Binary Counter, R. L. Trent, and Canadian IRE, p. 511, 1958 Canadian Convention Record, High Speed Reversible Counters.

Thereafter, the pulse of FIG. 3*g* is provided on lead 20 causing enable gate 12 to generate the start of the B gate at time $2T_1-T_{g/2}$. After a period of time $T_g$, the pulse of FIG. 3*h* occurs on lead 21 causing enable gate 12 to terminate the B gate. During the period of the B gate, variable frequency pulses are applied to ½ count reversible counter and reversible counter 15 and 16 respectively. The number of such variable frequency pulses counted by 15 and 16 establishes the value $V_2$, and since 15 and 16 were switched to subtract conditions, the pulses stored in 15 and 16 now correspond to the value $2V_{1'}-V_2$. Pulse 3*h* also turns off time gate generator 7. The trailing edge of output wave 3*c* of 7 turns off gate 8 preventing further application of fixed frequency timing oscillations to flip-flops 11.

Flip-flops 11 may comprise various forms of well-known binary counting stages with multiple output leads to establish various timing positions. Enable gate 12 may comprise separate binary stages associated with leads 13, 18 and 20, 21 respectively and provides gating signal output as shown in FIGURE 3*i* to control the timing and direction of count of the counters 15 and 16. Add and subtract gate may comprise a bistable multivibrator which is triggered from an original state to a second state by FIG. 3*f* establishing a subtract condition and which is returned to the original state by a manual reset control not shown by application of gates over leads 25 and 26 to counters 16 and 15 respectively.

While a specific embodiment has been shown and described, it will of course be understood that various modifications may yet be devised by those skilled in the art which will embody the principles of the invention and found in the true spirit and scope thereof.

What I claim and desire to secure by Letters Patent of the United States is:

1. Apparatus for determining the value of a dependent function V at a selected point $V_0$ where said dependent function varies with respect to an independent variable T in a manner at least approximately known, comprising means for receiving a plurality of signals varying according to changes in said function V; means for generating pulses from said signals; a reversible counter for counting said pulses; means for starting the count of said pulses by said counter at a time equal to $T_1-\Delta T-T_g$ and means for stopping said count by said counter at a time equal to $T_1-\Delta T+T_g$ to yield a number of pulses in said counter proportional to $2V_{1'}$ where $T_1$ represents a value of the independent variable T, $\Delta T$ represents a magnitude of the variable T determined in accordance with the extent of deviation from a linear relationship between the independent variable T and the dependent variable V, the sum of $T_g$ and $T_g$ or $2T_g$ represents the total length of sampling period during which said count is made, and $V_{1'}$ represents the average value of the function V during the period $2T_g$; means for subtracting a plurality of pulses from said reversible counter; means for starting said subtracting count at a time equal to $2T_1-T_g/2$ and means for stopping said subtracting count at a time equal to $2T_1+T_g/2$ to result in a subtracting count proportional to $V_2$ where $V_2$ represents the average value of the function V during a second sampling period centered about a time equal to $2T_1$ and having the length $T_g$; the resulting number of pulses in said reversible counter thereby equaling $2V_{1'}-V_2$ which is equal to substantially the desired value of V at $V_0$.

2. Apparatus for determining the value of a dependent function V at a selected point $V_0$ where said function varies with respect to an independent variable T in a manner at least approximately known, comprising means for receiving a plurality of signals varying according to changes in said function V; means for converting said signals to pulses of use in a computer; a reversible counter for counting said pulses; means for first starting the count of said pulses at a time equal to $T_1-\Delta T-T_g$ and means for stopping said first count at a time equal to $T_1-\Delta T+T_g$ to yield a first resulting count equal to $2V_{1'}$ where $T_1$ represents a first value of the independent variable time as designated by T, $\Delta T$ represents a period of time proportioned to the exent of deviation from a linear relationship between the independent variable T and the dependent variable V, the sum of $T_g$ plus $T_g$ or $2T_g$ defines the length of time during which said count is made, and $V_{1'}$ represents the average value of the function V during the period $2T_g$; means for subtracting a plurality of pulses from said reversible counter; means for starting said subtracting count at a time equal to $2T_1-T_g/2$ and means for stopping said subtracting count at a time equal to $2T_1+T_g/2$ to yield a subtracting count proportional to $V_2$ where $V_2$ represents the average value of the function V during a time period centered about the time $2T_1$ and being of length $T_g$; the resulting count in said reversible counter thereby equalling $2V_{1'}-V_2$ or substantially the value of $V_0$ at a time $T_0$.

References Cited by the Examiner

UNITED STATES PATENTS 3,155,821 11/1964 Shain -------------- 235—168

ROBERT C. BAILEY, *Primary Examiner.*